July 17, 1928.
C. R. SESSIONS
CRITICAL SPEED CONTROL
Filed May 29, 1922
1,677,496
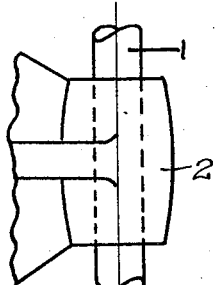
Fig II.
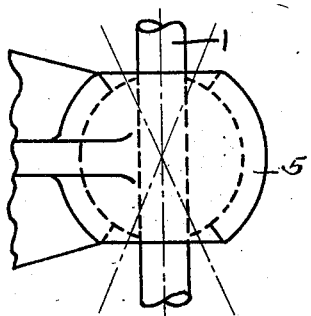
Fig III.
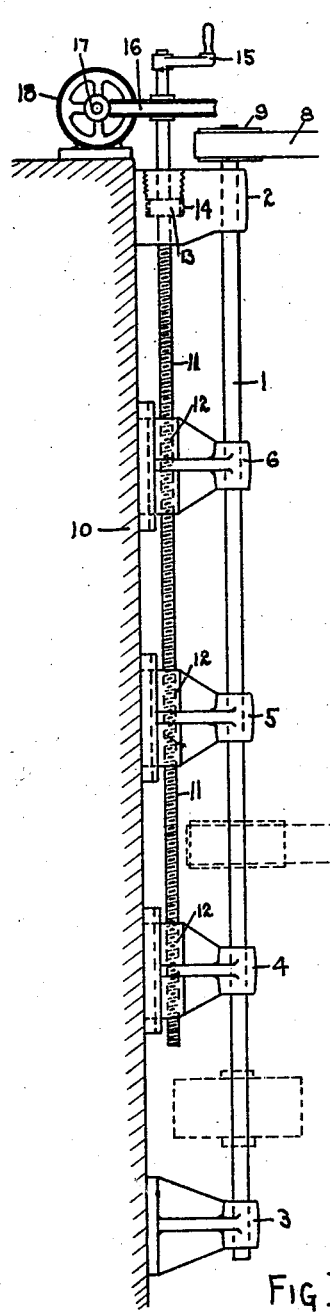
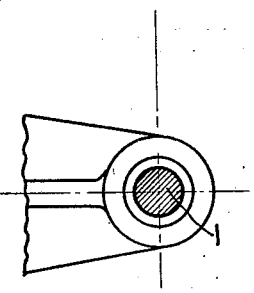
Fig IV.
Fig I.
WITNESSES
INVENTOR
C. R. Sessions Patented July 17, 1928.

1,677,496

UNITED STATES PATENT OFFICE.

CHARLES ROBERT SESSIONS, OF SAN FRANCISCO, CALIFORNIA, ASSIGNOR OF ONE-HALF TO JOHN A. DENT, OF LAWRENCE, KANSAS.

CRITICAL-SPEED CONTROL.

Application filed May 29, 1922. Serial No. 564,665.

This invention relates to a construction affording means to control the frequency of vibration, or whirling, of a revolving shaft so that the speed of revolution may not coincide or be unfavorably near coinciding with a whirling or critical speed of the shaft.

Another object of this invention is to produce a construction lessening or eliminating vibration and the severe strain due to critical deflection.

A further object of the invention is to produce a construction adapted to high speed.

Other objects of the invention will appear as the description proceeds. An embodiment of the invention is shown in the corresponding drawings in which the same reference numeral is applied to the same portion throughout, but I am aware that there may be modifications thereof.

Fig. I is a view of a shaft carried in two or more bearings with means of adjusting the position of these bearings in the direction of the axis of the shaft.

Fig. II shows a fixed bearing.

Fig. III shows a free bearing.

Fig. IV illustrates a large bore bearing.

In detail, the construction illustrated in the drawings comprises a shaft 1 adapted to be rotated by a drive belt 8 passing around a pulley 9, the shaft 1 being rotatably journaled at its opposite ends in fixed bearings 2 and 3. The type of fixed bearing utilized is shown in Fig. II. The use of a relatively long flexible shaft 1 for deep well pump work, without providing any intermediate bearings on said shaft, has disclosed that such a shaft will have numerous critical speeds, depending upon the shaft length, diameter, revolving speed, axial stress, and so forth. Between the critical speeds of the shaft, there are speeds at which the shaft will not vibrate and at which, if it is forcibly deflected, said shaft will positively return to a quiet condition, a condition of operation that is to be desired. In order to keep the shaft in a quiet running condition at all times, my invention contemplates the placing of a third bearing at or near one of the two fixed bearings, 2 or 3, so that the third bearing can be moved or adjusted relative to the other bearings to effectively shorten the shaft length. In Fig. I, I have shown a bearing 6, a detail of which is shown in Fig. III, arranged near the fixed bearing 2. Although I speak of shortening the shaft length, actually such a condition does not take place, because the shaft in all cases is a definite piece of material of fixed length, but the effective length of the shaft between the fixed bearing 3 and the movable bearing 6 is changed and this effective length between bearings is the variable factor for controlling the critical speed of said shaft. After the third or adjustable bearing 6 has been regulated to operating conditions, the fixed bearing 2 could be removed from the construction, and not interfere with the efficiency of operation of the shaft 1. However, the fixed bearing 2 would never be omitted from the construction, because, although the length of the shaft 1 can be calculated to cope with the conditions under which it is to be operated, nevertheless, operating conditions may change or vary, and hence the movable bearing 6 can be altered accordingly to meet and function with the new conditions of operation. A pair of bearings 4 and 5, a detail of which is shown in Fig. IV, are interposed between the movable bearing 6 and the fixed bearing 3. The large bore control bearings 4 and 5 prevent great lateral deflection of the shaft at critical speed. The operation of these large bore bearings will be hereinafter explained in greater detail.

Bearings 4, 5, 6 etc. are slidably held on a frame or column 10 and are moved in the direction of the axis of the shaft by a screw 11 turning in a thread 12 in the body of the bearings. The screw 11 has a portion 13 fitting in a recess 14 in the body of the bearing 2 to take the thrust. The pitch of the threads 12 in bearings 5 and 6 may be respectively two and four times that in bearing 4 so that equal distances between bearings may be maintained. The screw 11 may be operated manually by a crank 15 or may be operated by a gear 16—17 driven by a motor 18 actuated by suitable electric current.

Axial stress on the shaft 1 may be carried by suitable thrust bearings forming part, for example, of bearings 2 and 3. This stress may be varied by weight in the case of a vertical shaft and generally by the movement of bearing 2 relatively to the bearing 3 and in the direction of the axis of the shaft.

In long shafts, in starting and stopping, great lateral deflection is prevented at critical speed by placing, at suitable intermediate points, large bore control bearings as shown in Fig. IV. The bore of these bearings is large so that at normal running the shaft does not touch the bearing surface but at critical or whirling speeds the shaft rolls and rubs on the bearing surface and is restrained against extreme deflection.

I am aware that a revolving shaft, depending on its diameter, length, nature of loading, character of bearing support, axial and torsional stress, and coefficient of elasticity, will have one or more critical or whirling speeds,—speeds of revolution at which the periodic disturbing force of unbalance has the frequency of natural vibration and at which the shaft whirls,— or the speed at which the elastic resistance of the shaft to lateral deflection is overcome by the centrifugal force of unbalance. Therefore a vibrating shaft may be quieted or made to run smoothly by varying its length between bearings or its axial stress so that its critical or whirling speed would occur at a speed of revolution conveniently remote from the operating speed. Axial stress may be difficult to predetermine in design and may vary in operation. In such a case the shaft length between bearings may be varied to suit and to cause the operating speed to be favorably non-coincident with a critical or whirling speed. If the bearing length is fixed by construction it may be convenient to vary the axial stress to obtain quiet running.

My calculations show that a vertical steel shaft, $\tfrac{7}{8}$ of an inch in diameter—100 feet long between top and bottom bearings, revolving at a constant speed of 5,000 revolutions per minute, with an axial tension of 150 pounds, and transmitting a torsional stress of 5 horse power, will be vibrating at approximately its sixty first critical speed. A change of 18 inches in the effective shaft length, caused by moving the movable bearing 6 approximately 18 inches down on the shaft 1, away from the fixed bearing 2, will change the vibrating condition of the shaft to that of the next critical condition below the sixty first critical speed. A change in the effective shaft length of about 9 inches would correspond to a condition of no vibration, being the quiet condition of operation to be desired. The sixty first critical speed, above referred to, means that speed at which the shaft would vibrate critically the sixty first time if the shaft were revolved under the conditions already mentioned from rest, progressively, up to 5,000 revolutions per minute and passing through the first, third, fifth and so forth, up to the sixty first critical speed. The sixty first critical speed, above referred to, means that speed of revolution synchronizing or resonant with the vibrating periods of the shaft, (a fundamental and odd harmonics, 1—3—5—7 ... 59—61—63, etc.), if it were revolved under the conditions already mentioned from rest, progresively, up to 5,000 revolutions per minute and passing through the 1st—3rd—5th ... 59th and 61st critical speeds. As I have calculated, an adjustment of the movable bearing 6 within a range of from 9 to 18 inches will thus control the critical speed of the shaft and determine the efficient or inefficient operating condition of the shaft.

A vertical shaft has been used for illustration but my invention is not changed if the shaft is horizontally supported or may have concentrated or lateral loading as shown by dotted lines in Fig. I. My invention is equally applicable to a shaft having two, three, or more bearings.

What I claim is as follows, but various modifications may be made in the construction shown in the drawings and above described form within the purview of my invention:

1. In combination, fixed bearings; a driven shaft having its opposite ends journaled in said bearings; and means, adjacent one of said bearings, adjustable axially relative thereto to control the frequency of vibration of said shaft at various critical speeds.

2. An apparatus to control the frequency of vibration of a driven shaft comprised of a bearing arranged adjacent an end of the shaft in proximate contact therewith; and means to move the bearing axially relative to said shaft as the critical speed of the shaft varies.

3. An apparatus to control the frequency of vibration of a driven shaft comprised of, fixed bearings having the opposite ends of the shaft journaled therein, and a movable bearing arranged between the fixed bearings; and means to vary the distance between the movable bearing and the fixed bearings to regulate the whirling speed of the shaft and control the frequency of vibration at any critical speed.

4. An apparatus such as described comprising in combination, fixed shaft bearings; a shaft journaled in said beaings; a plurality of free bearings intermediate said fixed bearings and having said shaft confined therein; and means on said fixed bearings connected to said free bearings for adjusting said free bearings axially relative to said fixed bearings when said shaft is revolving near its critical whirling speed for controlling the lateral deflection of said shaft.

5. In combination with a rotatable shaft journaled in fixed bearings, of means for controlling the whirling speed of said shaft, comprising, adjustable free bearings intermediate said fixed bearings; and means for varying the distance between the free and fixed bearings relative to said revolving shaft to compensate for variations in axial stress.

6. An apparatus to control the vibration of a rotating shaft at various critical speeds, comprised of a shaft journaled at its opposite ends in fixed bearings; means to rotate said shaft; and a bearing adjacent an end of said shaft adjustable axially thereon relative to one of the fixed bearings.

7. An apparatus to control the vibration of a rotating shaft at various critical speeds, comprised of a shaft journaled at its opposite ends in fixed bearings; means to rotate said shaft; a bearing adjacent an end of said shaft adjustable axially thereon relative to one of the fixed bearings; and means to adjust the last mentioned bearing axially.

CHARLES ROBERT SESSIONS.